(12) United States Patent
Aoki et al.

(10) Patent No.: US 12,153,173 B2
(45) Date of Patent: Nov. 26, 2024

(54) RADIOGRAPHIC DEVICE

(71) Applicants: NATIONAL UNIVERSITY CORPORATION SHIZUOKA UNIVERSITY, Shizuoka (JP); ANSeeN Inc., Hamamatsu (JP)

(72) Inventors: Toru Aoki, Hamamatsu (JP); Katsuyuki Takagi, Hamamatsu (JP); Akifumi Koike, Hamamatsu (JP)

(73) Assignees: NATIONAL UNIVERSITY CORPORATION SHIZUOKA UNIVERSITY (JP); ANSEEN INC (JP)

( * ) Notice: Subject to any disclaimer, the term of this patent is extended or adjusted under 35 U.S.C. 154(b) by 0 days.

(21) Appl. No.: 17/778,552

(22) PCT Filed: Oct. 6, 2020

(86) PCT No.: PCT/JP2020/037866
§ 371 (c)(1),
(2) Date: May 20, 2022

(87) PCT Pub. No.: WO2022/074732
PCT Pub. Date: Apr. 14, 2022

(65) Prior Publication Data
US 2023/0008884 A1    Jan. 12, 2023

(51) Int. Cl.
*G01T 1/24* (2006.01)
*G01T 1/20* (2006.01)
(52) U.S. Cl.
CPC .............. *G01T 1/24* (2013.01); *G01T 1/2018* (2013.01)
(58) Field of Classification Search
None
See application file for complete search history.

(56) References Cited

U.S. PATENT DOCUMENTS

2001/0025914 A1* 10/2001 Pyyhtia .................. G01T 1/247
250/208.1
2005/0156114 A1* 7/2005 Yokoi .................. G01T 1/2928
250/370.09
(Continued)

FOREIGN PATENT DOCUMENTS

JP    2001-527295 A    12/2001
JP    2003-527610 A    9/2003
(Continued)

OTHER PUBLICATIONS

International Search Report mailed Dec. 1, 2020 in corresponding PCT International Application No. PCT/JP2020/037866.
(Continued)

*Primary Examiner* — Edwin C Gunberg
(74) *Attorney, Agent, or Firm* — OSTROLENK FABER LLP

(57) ABSTRACT

An object is to improve the reliability of output information by simplifying a wiring route. A radiation image sensor includes a radiation detector in which a plurality of pixels of a charge generator for generating a charge corresponding to energy or the number of particles of incident radiation and a plurality of read circuits for outputting a digital value based on the charge generated by each pixel of the charge generator are mutually stacked and two-dimensionally disposed, and a circuit board on which a plurality of radiation detectors is disposed, in which the plurality of read circuits of one radiation detector is configured to transfer data indicating a digital value in the plurality of read circuits and then output the data to another adjacent radiation detector in response to a control signal from the outside.

18 Claims, 8 Drawing Sheets

(56) References Cited

U.S. PATENT DOCUMENTS

| | | | |
|---|---|---|---|
| 2009/0290680 A1 | 11/2009 | Tumer et al. | 378/62 |
| 2014/0003572 A1* | 1/2014 | Gregerson | A61B 6/56 |
| | | | 378/4 |

FOREIGN PATENT DOCUMENTS

| | | |
|---|---|---|
| JP | 2013-165471 A | 8/2013 |
| JP | 5800966 B | 10/2015 |
| JP | 2018-207291 | 12/2018 |
| WO | WO 99/033117 | 7/1999 |
| WO | WO 01/069284 | 9/2001 |
| WO | WO 2017/033675 A1 | 3/2017 |

OTHER PUBLICATIONS

Written Opinion mailed Dec. 1, 2020 in corresponding PCT International Application No. PCT/JP2020/037866.

English translation of the International Preliminary Report on Patentability (IPRP) (Chapter 1 or II of the PCT Treaty) mailed Apr. 20, 2023 with a Notification from the International Bureau (Form PCT/IB/338) in corresponding PCT International Application No. PCT/JP2020/037866.

* cited by examiner

RADIOGRAPHIC DEVICE

CROSS-REFERENCE TO RELATED APPLICATION

The present application is a 35 U.S.C. § 371 national stage application of International Application No. PCT/JP2020/037866, filed Oct. 6, 2020, the disclosure of which is incorporated herein by reference. The PCT International Application was published in the Japanese language.

TECHNICAL FIELD

The present disclosure describes a radiation imaging device.

BACKGROUND ART

As a conventional imaging device, as described in Patent Literature 1 below, there has been a known pixel sharing type structure including a plurality of pixels, a charge storage unit, and a transistor for reading a pixel signal. In this conventional structure, the charge storage unit and the transistor are shared between a plurality of pixels. Meanwhile, a technology for detecting the two-dimensional (2D) distribution of radiation has been developed. Such radiation detection technology is expected to be applied to medical fields, industrial fields, security fields, etc. A radiation detector using radiation detection technology generates an electric charge according to energy of radiation or an electric charge corresponding to the number of particles incident on the detector, for each pixel. Then, in a plurality of read circuits provided corresponding to each pixel, information related to radiation is obtained for each pixel by using a value obtained by integrating the electric charge or the number of particles.

CITATION LIST

Patent Literature

Patent Literature 1: Japanese Unexamined Patent Publication No. 2018-207291

SUMMARY OF INVENTION

Technical Problem

In the conventional radiation detector, a configuration in which a plurality of detectors is arranged is used to expand a detection region. In such a configuration, a wiring route for outputting from a plurality of detectors having a plurality of pixels to an external circuit board, etc. tends to be complicated. Therefore, noise may be generated in signals output from the plurality of detectors, or interference may occur between output signals from the plurality of detectors. Therefore, in the conventional radiation detector, the reliability of output information for each pixel may decrease.

The disclosure describes a radiation imaging device capable of simplifying the wiring route to improve the reliability of output information.

Solution to Problem

A radiation imaging device which is one aspect of the disclosure includes a radiation detector in which a plurality of charge generation units configured to generate a charge corresponding to energy or the number of particles of incident radiation and a plurality of reading units configured to output a digital value based on the charge generated by each of the plurality of charge generation units are mutually stacked and two-dimensionally disposed, and a circuit board on which a plurality of radiation detectors is disposed, in which the plurality of reading units of one of the radiation detectors is configured to transfer data indicating the digital value in the plurality of reading units and then output the data to another adjacent radiation detector in response to a control signal from an outside.

In this radiation imaging device, a digital value based on a charge generated by the plurality of charge generation units is output in each of the plurality of reading units. At this time, each of the plurality of reading units transfers data indicating a digital value in the plurality of reading units, and then outputs the data to an adjacent radiation detector in response to a control signal from the outside. With such a configuration, wiring for outputting data to the outside becomes unnecessary in at least some reading units in the plurality of radiation detectors. As a result, a wiring route for data output is simplified, and the reliability of the output information indicated by the data can be improved.

In the one aspect, the plurality of reading units may be configured to sequentially transfer data indicating the digital value to another adjacent reading unit in response to a control signal from an outside. In this case, each of the plurality of reading units sequentially transfers the data indicating the digital value to the adjacent reading unit in response to the control signal from the outside. With such a configuration, wiring for outputting data to the outside becomes unnecessary in at least some reading units in the radiation detector. As a result, the wiring route for data output can be simplified, and the reliability of the output information indicated by the data can be improved.

In the one aspect, the plurality of reading units may be configured to transfer the data via all reading units included in the one radiation detector. In this case, the plurality of reading units transfers the data indicating the digital value via all the reading units in response to the control signal from the outside. With such a configuration, wiring for outputting data to the outside becomes unnecessary in more reading units in the radiation detector. As a result, the wiring route for data output can be further simplified, and the reliability of the output information indicated by the data can be further improved.

In the one aspect, at least one of reading units being an outermost unit in the radiation detector among the plurality of reading units may be configured to output the data transferred from another adjacent reading unit to the circuit board in response to the control signal. According to this configuration, since the outermost reading unit outputs the data transferred from another adjacent reading unit to the circuit board, the outermost reading unit can output the data sequentially transferred via the plurality of reading units in the radiation detector to the circuit board. In this way, wiring for outputting data from the plurality of reading units in the radiation detector becomes unnecessary, and the number of wirings connected to one radiation detector can be efficiently reduced. As a result, the reliability of the output information can be further improved.

In the one aspect, at least one of the reading units being an outermost unit in the radiation detector among the plurality of reading units of the radiation detector may be configured to store or transfer the data output from the reading units being an outermost unit of another radiation detector adjacent to the radiation detector. According to this configuration, the outermost reading unit in one radiation detector functions to store and transfer the data output from the outermost reading unit of another radiation detector adjacent to the one radiation detector. In this way, it is possible to shorten the wiring for outputting data from another radiation detector. As a result, the reliability of the output information can be further improved.

In one aspect, the radiation imaging device may further include another circuit board in which the plurality of reading units is formed, in which at least one of the reading units being an outermost unit may output the data to the circuit board via a through electrode penetrating the another circuit board. According to this configuration, the wiring connecting the outermost reading unit and the circuit board can be formed within a range of the charge generation unit, and a gap between the plurality of radiation detectors in the radiation imaging device can be reduced. As a result, it is possible to prevent occurrence of a dead zone in the radiation imaging device.

In one aspect, the radiation imaging device may further include another circuit board in which the plurality of reading units is formed, in which the data may be input to at least one of the reading units being an outermost unit via the circuit board and a through electrode penetrating the another circuit board. According to such a configuration, the wiring connecting the outermost reading unit and the circuit board can be formed within the range of the charge generation unit, and the gap between the plurality of radiation detectors 1 can be reduced. As a result, it is possible to prevent occurrence of a dead zone in the radiation imaging device.

Advantageous Effects of Invention

A radiation imaging device of the disclosure can simplify a wiring route to improve the reliability of output information.

DESCRIPTION OF EMBODIMENTS

Hereinafter, a radiation imaging device of the disclosure will be described in detail with reference to the accompanying drawings. In the description of the drawings, the same elements are designated by the same reference symbols, and duplicate description is omitted.

Figure 1:
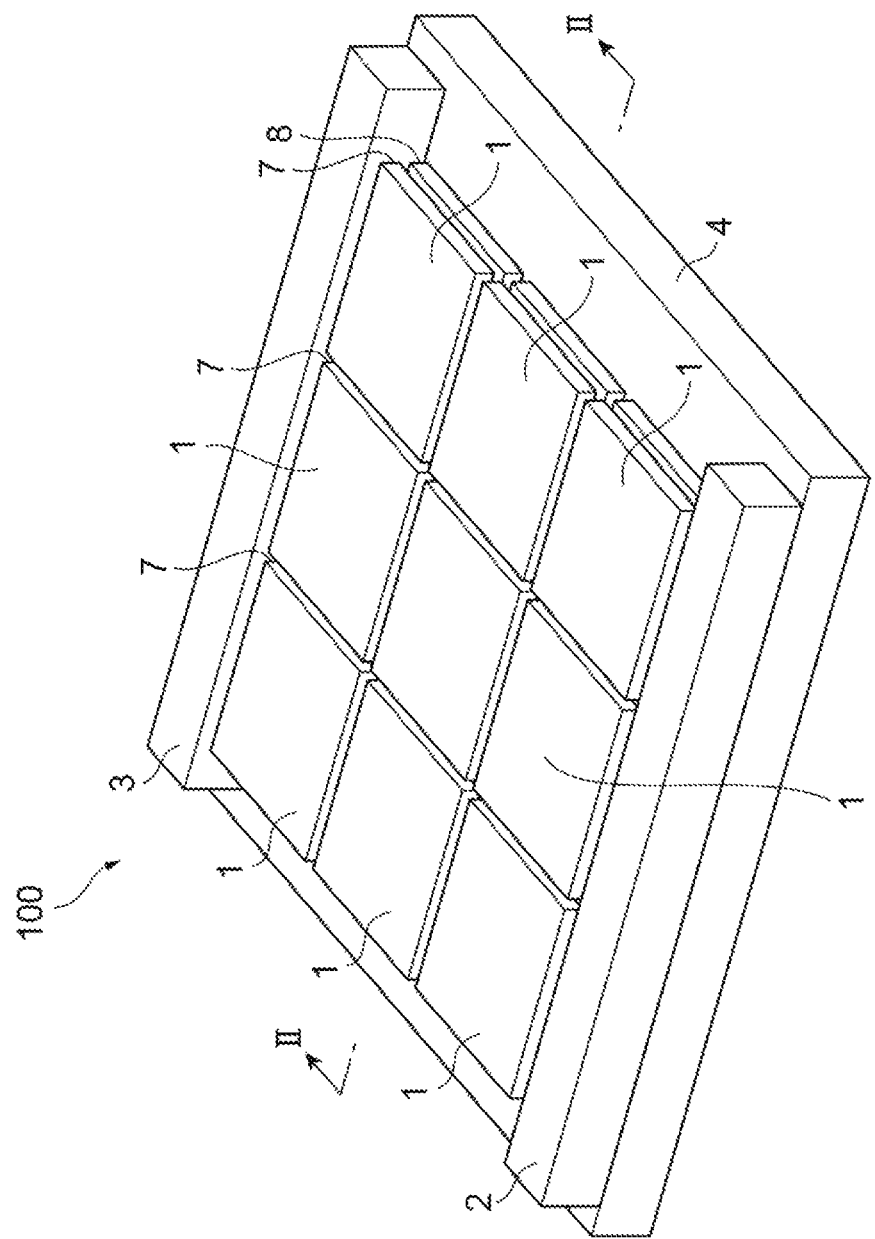
FIG. 1 is a perspective view illustrating a radiation image sensor according to an embodiment.

A radiation image sensor 100, which is a radiation imaging device according to an embodiment illustrated in FIG. 1, obtains a 2D image based on radiation arriving from an inspection target. Radiation is, for example, a gamma ray, an X-ray, an alpha ray, a beta ray, etc. The radiation image sensor 100 includes a radiation detector 1, a processing unit 2, a controller 3, and a circuit board 4. The radiation image sensor 100 has a plurality of radiation detectors 1.

The radiation detectors 1 are two-dimensionally disposed on the circuit board 4 having a rectangular plate shape so as to be arranged in one direction and a direction perpendicular to the one direction along a surface thereof. For example, a total of nine (3×3) radiation detectors 1 are two-dimensionally arranged on the circuit board 4. Each of the radiation detectors 1 has a plurality of pixels (charge generation units) two-dimensionally arranged along the surface of the circuit board 4, and outputs data indicating a pixel value corresponding to incident radiation for each pixel. The radiation detector 1 has one charge generator 7 and one read circuit board 8. A shape of each of the charge generator 7 and the read circuit board 8 is a rectangular plate. The radiation detector 1 has a stacked structure. One charge generator 7 is provided with one read circuit board 8 corresponding to the charge generator 7. Each charge generator 7 is stacked and disposed on the corresponding read circuit board 8. As will be described later, each charge generator 7 is electrically connected to the read circuit board 8 via bump electrodes. The charge generator 7 outputs a signal according to a charge corresponding to energy of radiation incident on each of the plurality of pixels. Then, the read circuit board 8 processes the charge generated by the charge generator 7 for each pixel. As a result, the read circuit board 8 generates a digital signal $\phi 2$ as a pixel value for each of the plurality of pixels. As will be described later, the read circuit board 8 outputs the digital signal $\phi 2$ for each of the plurality of pixels to the processing unit 2.

The processing unit 2 is connected to the plurality of radiation detectors 1 via the circuit board 4. The processing unit 2 receives the digital signal $\phi 2$ for each pixel from each radiation detector 1. For example, the processing unit 2 outputs a 2D image for all pixels included in the plurality of radiation detectors 1 based on the digital signal $\phi 2$ for each pixel received from the plurality of radiation detectors 1. The controller 3 is connected to the plurality of radiation detectors 1 via the circuit board 4. The controller 3 provides control signals to the plurality of radiation detectors 1.

Figure 2:
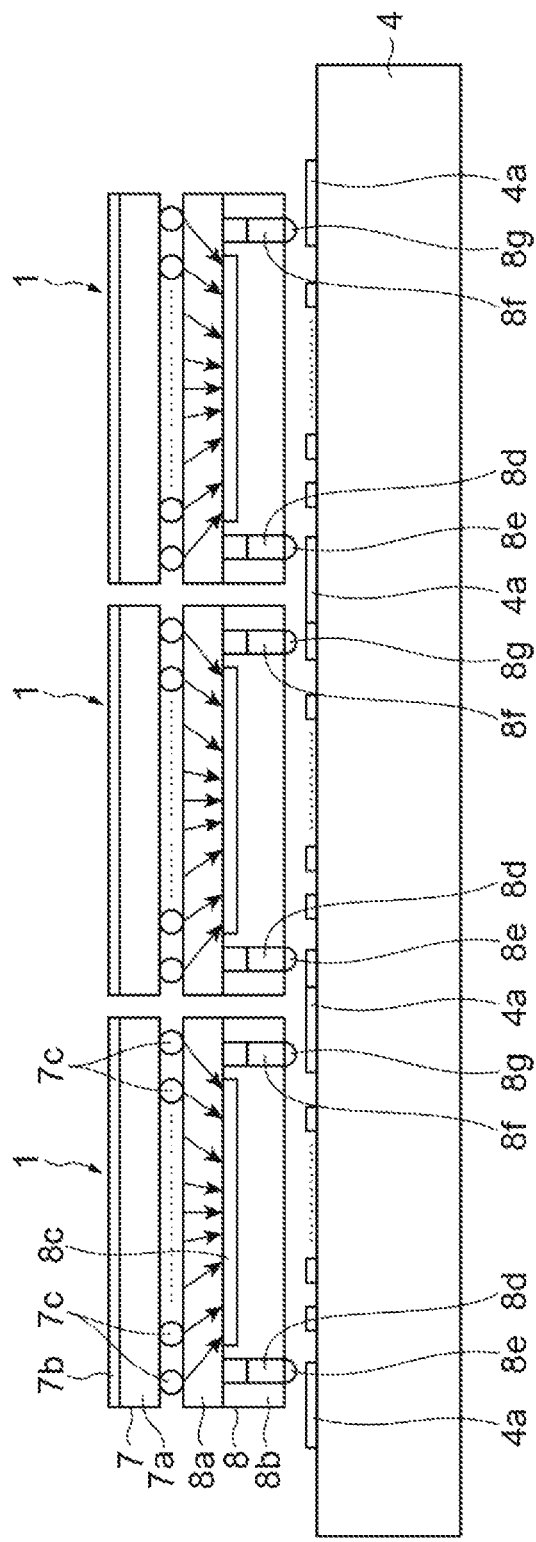
FIG. 2 is an end view of the radiation image sensor of FIG. 1 along a line II-II.

Configurations of the radiation detectors 1 and the circuit board 4 will be described in detail with reference to FIG. 2. FIG. 2 is an end view of the radiation image sensor 100 of FIG. 1 along a line II-II. As described above, the radiation detector 1 has the charge generator 7 and the read circuit board 8.

The charge generator 7 receives radiation such as an X-ray. The charge generator 7 generates an electron-hole pair (charge pair) for each pixel by the received X-ray. That is, the charge generator 7 converts the received radiation into a current signal (charge signal) corresponding to its energy at each pixel. As the charge generator 7, for example, it is possible to use a Cd (Zn) Te charge generator, a Si charge generator, a Ge charge generator, a GaAs charge generator, a GaN charge generator, a TlBr charge generator, etc. Further, as the charge generator 7, it is possible to use a device including a scintillator and a photodetector for each pixel. The scintillator converts an X-ray into light. The photodetector converts the light produced by the scintillator into an electric charge.

FIG. 2 illustrates a configuration example of the charge generator 7 when a compound semiconductor such as CdTe is included as a detection element. As described above, the charge generator 7 includes a rectangular flat plate-shaped detection element 7a, a surface electrode 7b, and a plurality of bump electrodes 7c. The surface electrode 7b is formed on the entire surface of the detection element 7a on a radiation incident side. On a back surface of the detection element 7a, the bump electrodes 7c, which are two-dimensionally arranged protrusion-shaped electrodes, are formed. In the radiation detector 1 having such a structure, each of a plurality of regions of the charge generator 7 facing the bump electrodes 7c forms a pixel (charge generation unit). When the radiation image sensor 100 is used, a positive bias voltage is applied to the surface electrode 7b from the outside. As a result, a current signal corresponding to energy of the radiation incident on each pixel of the detection element 7a is generated, and the current signal is taken out from the corresponding bump electrode 7c to the read circuit board 8. For example, 96×96 bump electrodes 7c are two-dimensionally arranged on the back surface of the detection element 7a. In such a configuration, the radiation detector 1 has 96×96 pixels arranged two-dimensionally.

The read circuit board 8 converts a charge $\phi 1$ into a digital signal $\phi 2$ which is a pixel value based on a current signal output by each pixel of the charge generator 7. Further, the read circuit board 8 outputs the digital signal $\phi 2$ for each pixel to the processing unit 2. The digital signal $\phi 2$ for each pixel contains at least information about energy possessed by radiation incident on each pixel.

Specifically, the read circuit board 8 has a two-layer structure of a wiring layer 8a and an integrated circuit layer 8b. The wiring layer 8a is held in a state where a surface opposite to the integrated circuit layer 8b is in contact with the plurality of bump electrodes 7c of the charge generator 7. The wiring layer 8a internally has an electric wiring that electrically connects the plurality of bump electrodes 7c and corresponding read circuits (details will be described later) in the integrated circuit layer 8b. The integrated circuit layer 8b incorporates a circuit group 8c in which a plurality of read circuits (reading units) is formed to process an electric signal output from each pixel of the charge generator 7 and output the digital signal $\phi 2$. Further, the integrated circuit layer 8b is provided with a through electrode 8d provided on one end side along a main surface to input a signal to the circuit group 8c, a bump electrode 8e for electrically connecting the through electrode 8d to the circuit board 4, a through electrode 8f provided on the other end side along the main surface to output a signal from the circuit group 8c, and a bump electrode 8g for electrically connecting the through electrode 8f to the circuit board 4. Each of the through electrode 8d and the through electrode 8f penetrates the integrated circuit layer 8b and is electrically connected to a read circuit (described later) at an outermost edge in the circuit group 8c. Note that two adjacent radiation detectors 1 are disposed so that the through electrode 8f and the bump electrode 8g provided in one radiation detector 1 and the through electrode 8d and the bump electrode 8e provided in the other radiation detector 1 come close to each other.

The circuit board 4 has a plurality of surface electrodes (electric wirings) 4a formed on a surface on which the radiation detectors 1 are mounted. The surface electrode 4a is a wiring portion for connecting the bump electrode 8e of the radiation detector 1 on the circuit board 4 to the controller 3 or the bump electrode 8g of the adjacent radiation detector 1 on the circuit board 4 and connecting the bump electrode 8g of the radiation detector 1 on the circuit board 4 to the processing unit 2 or the bump electrode 8e of the adjacent radiation detector 1.

Figure 3:
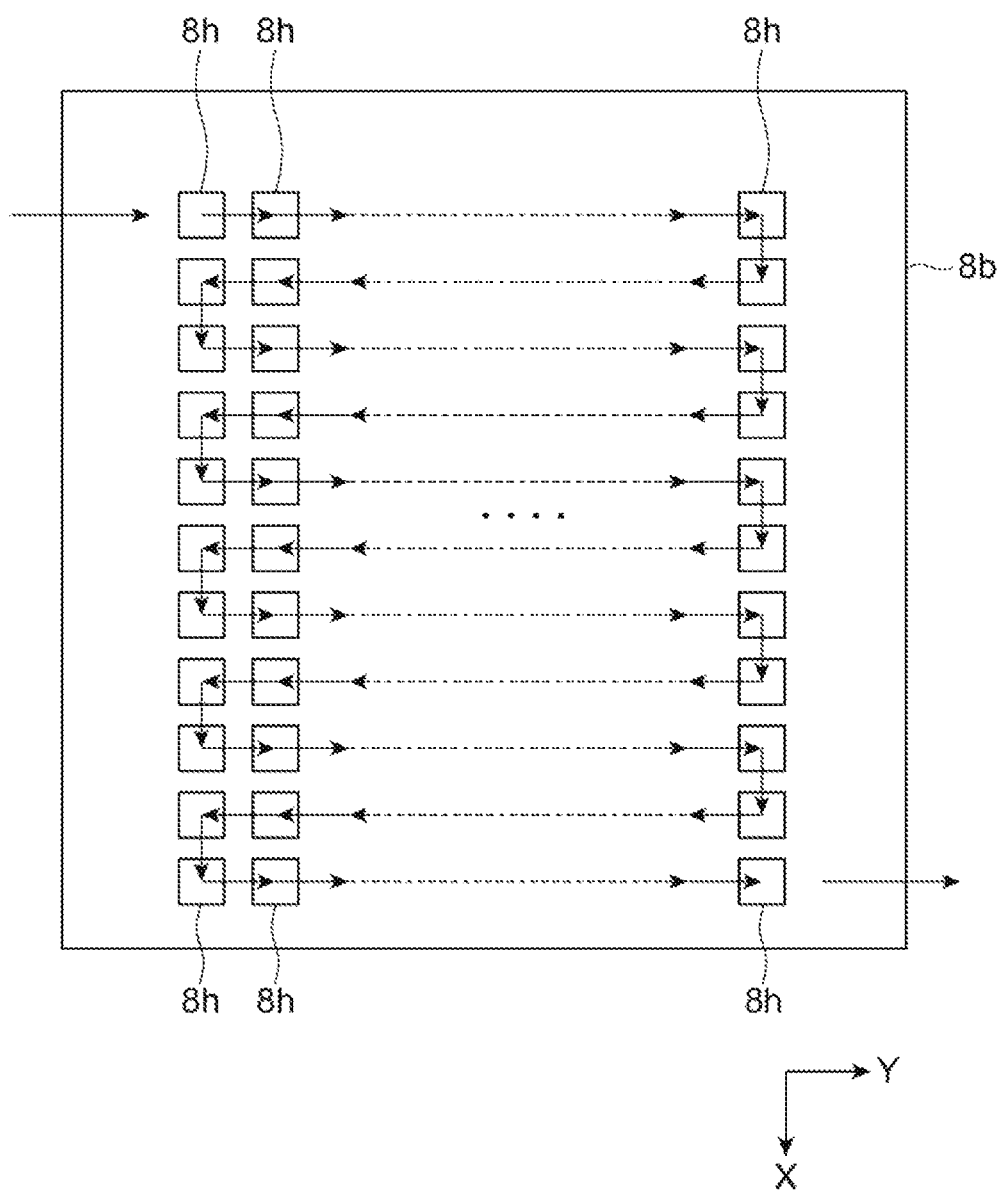
FIG. 3 is a plan view illustrating arrangement of read circuits 8h in an integrated circuit layer 8b of FIG. 2.

Here, a configuration of the read circuit in the integrated circuit layer 8b will be described in detail with reference to FIGS. 3 and 4. FIG. 3 is a plan view illustrating arrangement of read circuits 8h in the integrated circuit layer 8b, and FIG. 4 illustrates a configuration of a read circuit 8h.

As illustrated in FIG. 3, the integrated circuit layer 8b internally has a plurality of read circuits 8h arranged two-dimensionally to correspond to the plurality of pixels of the radiation detector 1. For example, when the radiation detector 1 has 96×96 two-dimensionally arranged pixels, a plurality of (96×96) read circuits 8h two-dimensionally arranged is included to correspond thereto.

Figure 4:
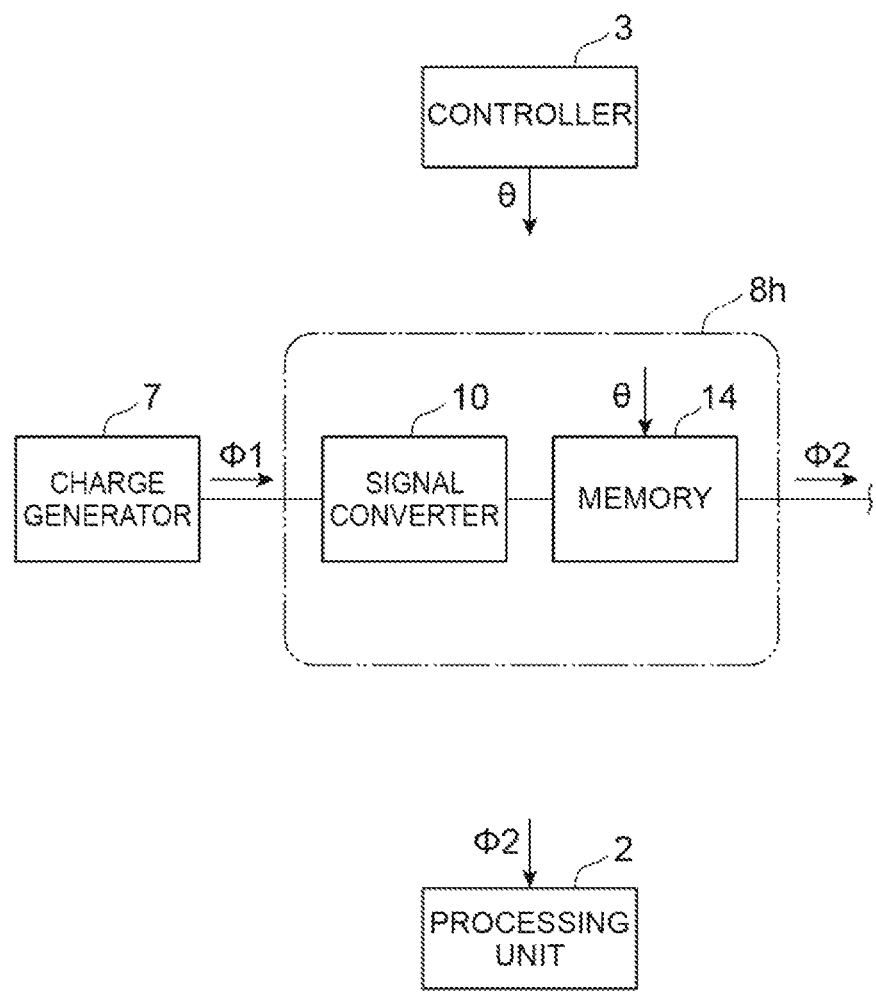
FIG. 4 is a block diagram illustrating a configuration of a read circuit 8h of FIG. 3.

As illustrated in FIG. 4, the read circuit 8h includes a signal converter 10 and a memory 14. That is, one signal converter 10 and one memory 14 are connected to one pixel of the charge generator 7.

The signal converter 10 is electrically connected to the bump electrode 7c of the corresponding pixel of the charge generator 7 via the wiring layer 8a. The signal converter 10 receives a charge $\phi 1$ based on a current signal from the corresponding pixel in the charge generator 7. Then, the signal converter 10 discretizes an analog signal based on the charge $\phi 1$ and outputs the signal as a digital signal. That is, the signal converter 10 is an A/D converter. For example, the resolution of the signal converter 10 may be 10 bits. This analog signal is expressed as a voltage and corresponds to energy of radiation incident on the corresponding pixel in the charge generator 7.

The memory 14 is connected to the signal converter 10 and receives a digital signal from the signal converter 10. Then, the memory 14 stores the digital signal $\phi 2$ each time a digital signal is input. Further, the memory 14 is connected to the memory 14 of the read circuit 8h corresponding to another adjacent pixel. Then, in response to a control signal $\theta$ provided from the controller 3, the memory 14 outputs the digital signal $\phi 2$ generated by the signal converter 10 to the memory 14 corresponding to another adjacent pixel, or outputs the digital signal $\phi 2$ to the outside (processing unit 2 or an adjacent radiation detector 1) via the through electrode 8f, the bump electrode 8g, and the surface electrode 4a. Further, the memory 14 sequentially overwrites and saves the digital signal $\phi 2$ received from the read circuit 8h corresponding to another adjacent pixel or the digital signal $\phi 2$ received from the adjacent radiation detector 1 via the surface electrode 4a, the bump electrode 8e, and the through electrode 8d. Then, in response to the control signal, the memory 14 outputs the digital signal $\phi 2$ received from another pixel to the memory 14 corresponding to another adjacent pixel, or outputs the digital signal $\phi 2$ to the outside (the processing unit 2 or the adjacent radiation detector 1) via the through electrode 8f, the bump electrode 8g, and the surface electrode 4a.

Returning to FIG. 3, a description will be given of a data transfer function by memories 14 of the plurality of read circuits 8h included in one radiation detector 1. The corresponding read circuits 8h of the plurality of pixels are two-dimensionally arranged along one direction (one-dimensional direction) and another direction perpendicular to the one direction along a surface of the rectangular flat plate-shaped integrated circuit layer 8b to correspond to arrangement of the plurality of pixels. These read circuits 8h sequentially transfer the digital signal $\phi 2$ to another adjacent read circuit 8*h* in response to the control signal from the controller 3 (that is, perform serial data transfer). In the following description, the one direction is defined as an X-axis direction, a +X direction is set as a downward direction, a −X direction is set as an upward direction, the other direction is defined as a Y-axis direction, a +Y direction is set as a rightward direction, and a −Y direction is set as a leftward direction.

With regard to a plurality of read circuits 8*h* in an outermost end row in the upward direction, except for read circuits 8*h* at left and right outermost edges, in response to a control signal, after sequentially saving the digital signal ϕ2 received from an adjacent read circuit 8*h* in the leftward direction, the saved digital signal ϕ2 is output (transferred) toward an adjacent read circuit 8*h* in the rightward direction. The read circuit 8*h* at the left end of the row receives the digital signal ϕ2 input from a read circuit 8*h* at an outermost edge of an adjacent radiation detector 1 via the surface electrode 4*a*, the bump electrode 8*e*, and the through electrode 8*d*, sequentially saves the digital signal ϕ2, and then outputs (transfers) the saved digital signal ϕ2 toward an adjacent read circuit 8*h* in the rightward direction. The read circuit 8*h* at the right end of the row sequentially saves the digital signal ϕ2 received from an adjacent read circuit 8*h* in the leftward direction, and then outputs (transfers) the saved digital signal ϕ2 toward an adjacent read circuit 8*h* in the downward direction, that is, a read circuit 8*h* at a right end of an adjacent row in the downward direction.

For a plurality of read circuits 8*h* in a second row adjacent to the outermost end row, an operation in which a data transfer direction is opposite to that of the above operation is performed. That is, except for read circuits 8*h* at left and right outermost edges, in response to a control signal, after sequentially saving the digital signal ϕ2 received from an adjacent read circuit 8*h* in the rightward direction, the saved digital signal ϕ2 is output toward an adjacent read circuit 8*h* in the leftward direction. A read circuit 8*h* at a right end of the row sequentially saves the digital signal ϕ2 output from the read circuit 8*h* at the right end of the adjacent row, and then outputs the saved digital signal ϕ2 toward an adjacent read circuit 8*h* in the leftward direction. A read circuit 8*h* at a left end of the row sequentially saves the digital signal ϕ2 received from an adjacent read circuit 8*h* in the rightward direction, and then outputs the saved digital signal ϕ2 toward an adjacent read circuit 8*h* in the downward direction, that is, a read circuit 8*h* at a left end of an adjacent row in the downward direction.

Read circuits 8*h* from a third row to an outermost end row in the downward direction have a similar data transfer function. However, the read circuit 8*h* at the outermost edge finally receiving transfer of data (read circuit 8*h* at a right end in the outermost end row in the downward direction in the example of FIG. 3) outputs the saved digital signal ϕ2 toward a read circuit 8*h* at an outermost edge of another adjacent radiation detector 1 or the processing unit 2 via the through electrode 8*f*, the bump electrode 8*g*, and the surface electrode 4*a*.

As described above, a plurality of read circuits 8*h* included in one radiation detector 1 is configured to receive one data input at the one read circuit 8*h* from an adjacent radiation detector 1 and transfer data of one data input via all the read circuits 8*h*, and then output the data to an adjacent radiation detector 1 from the other read circuits 8*h*, which is one data output. Meanwhile, it is possible to adopt a configuration in which a plurality of read circuits 8*h* included in one radiation detector 1 is divided into a plurality of regions, one data input and one data output are included for each of the plurality of divided regions, and data is transferred via all the read circuits 8*h*. Alternatively, one data input and a plurality of data outputs may be included for each of a plurality of divided regions, data may be transferred in parallel via all the read circuits 8*h*, and then the data may be output to an adjacent radiation detector 1 from read circuits 8*h*, which are a plurality of data outputs finally receiving transfer.

Figure 5:
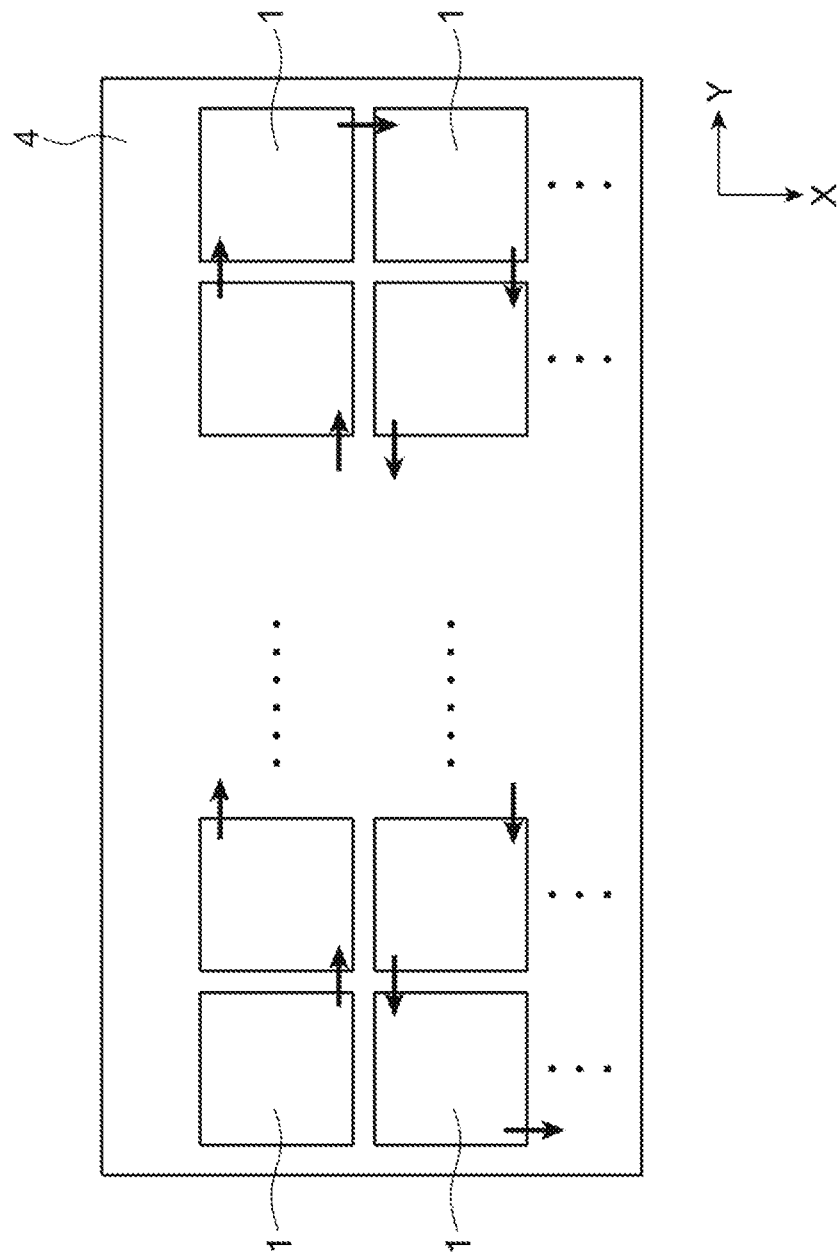
FIG. 5 is a plan view illustrating an example of a relationship between data transfer directions of radiation detectors 1 two-dimensionally arranged on a circuit board 4 of FIG. 2.
Figure 6:
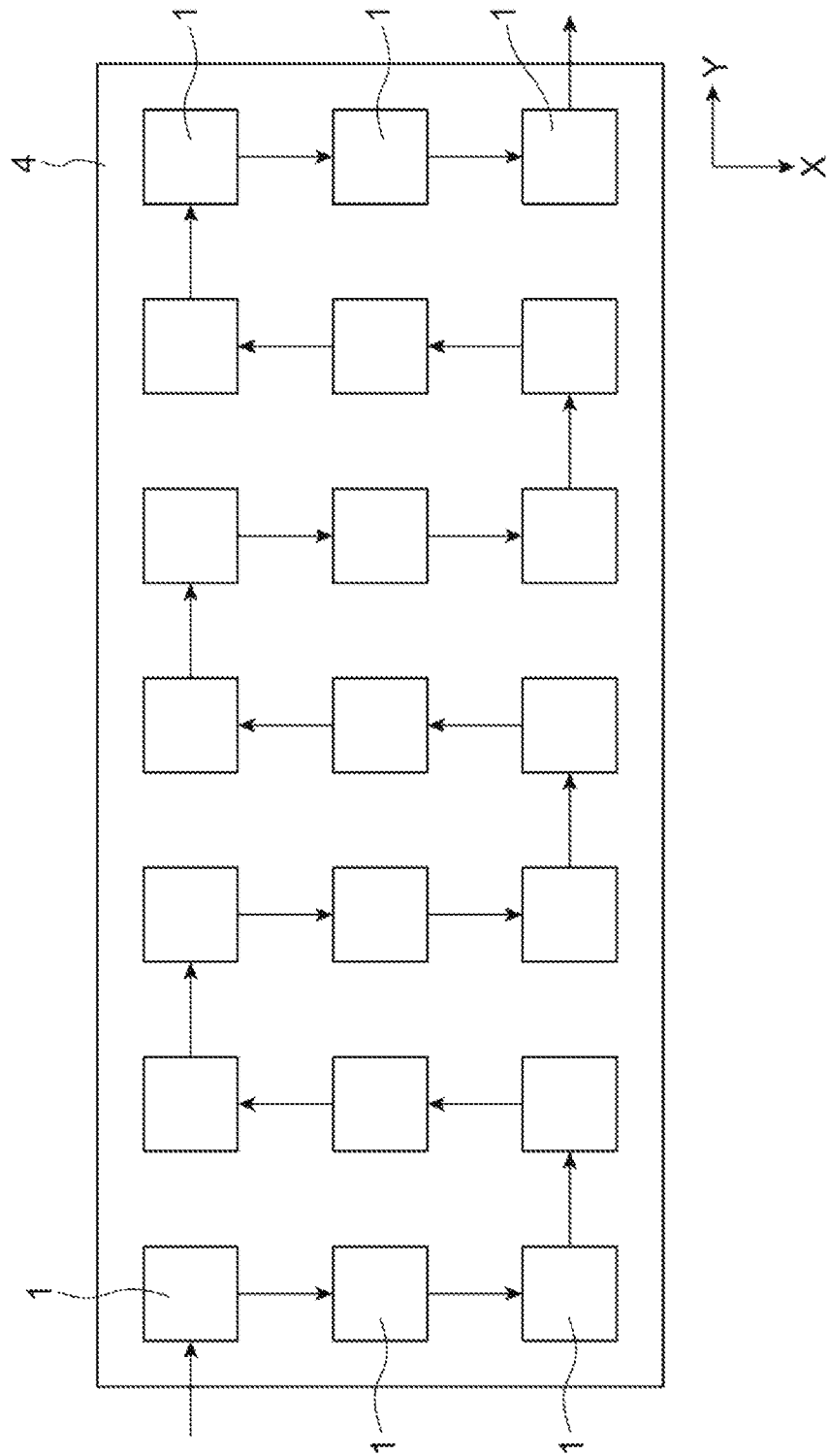
FIG. 6 is a plan view illustrating an example of a relationship between data transfer directions of the radiation detectors 1 two-dimensionally arranged on the circuit board 4 of FIG. 2.
Figure 7:
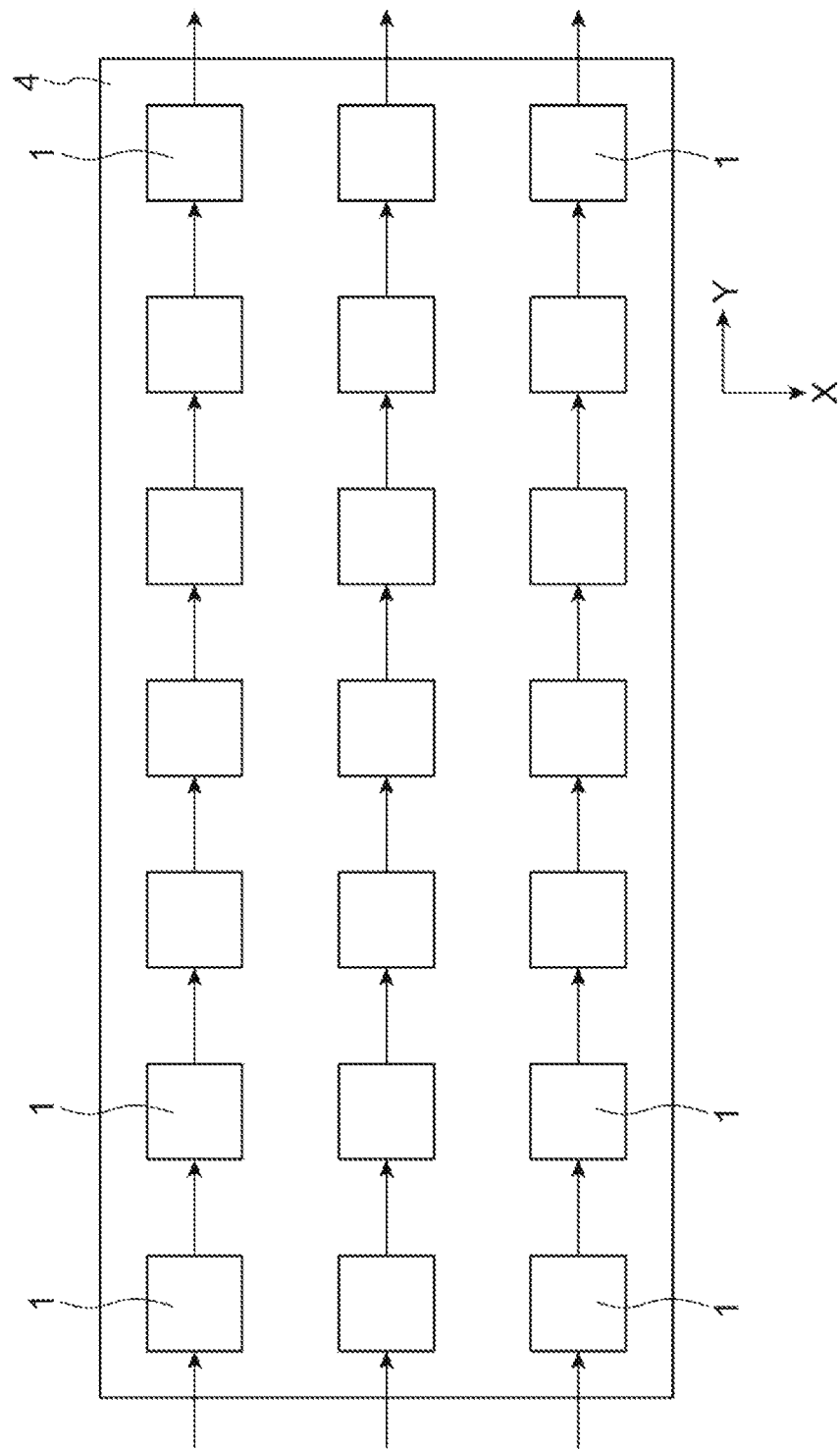
FIG. 7 is a plan view illustrating an example of a relationship between data transfer directions of the radiation detectors 1 two-dimensionally arranged on the circuit board 4 of FIG. 2.

A description will be given of a relationship between serial data transfer directions in the plurality of radiation detectors 1 included in the radiation image sensor 100 in with reference to FIGS. 5, 6, and 7. FIGS. 5 to 7 are plan views illustrating examples of relationships between data transfer directions of the radiation detectors 1 two-dimensionally arranged on the circuit board 4. Here, similarly to FIG. 4, one direction of an array direction of the radiation detectors 1 is defined as an X-axis direction, a +X direction is set as a downward direction, a −X direction is set as an upward direction, the other direction of the array direction is defined as a Y-axis direction, a +Y direction is set as a rightward direction, and a −Y direction is set as a leftward direction. In this way, the respective radiation detectors 1 are disposed so that data transfer directions thereof are substantially parallel to each other.

In the example of the transfer direction illustrated in FIG. 5, except for a radiation detector 1 at a left end, according to a control signal, a plurality of radiation detectors 1 at an outermost end row in the upward direction performs data transfer on the digital signal ϕ2, which is received from an adjacent radiation detector 1 in the leftward direction via the surface electrode 4*a*, the bump electrode 8*e*, and the through electrode 8*d*, via a plurality of internal read circuits 8*h*. According to a control signal, the radiation detector 1 at the left end of the row performs data transfer between a plurality of internal read circuits 8*h*. At the same time, except for a radiation detector 1 at a right end, according to a control signal, each of radiation detectors 1 outputs the digital signal ϕ2 saved in a read circuit 8*h* at an outermost edge toward an adjacent radiation detector 1 in the rightward direction via the through electrode 8*f*, the bump electrode 8*g*, and the surface electrode 4*a*. The radiation detector 1 at the right end of the row outputs the digital signal ϕ2 saved in the read circuit 8*h* at the outermost edge toward an adjacent radiation detector 1 in the downward direction via the through electrode 8*f*, the bump electrode 8*g*, and the surface electrode 4*a*.

For a plurality of plurality of radiation detectors 1 in a second row adjacent to the outermost end row, an operation in which a data transfer direction is opposite to that of the above operation is performed. That is, except for read circuits 8*h* at left and right outermost edges, in response to a control signal, the digital signal ϕ2 received from an adjacent radiation detector 1 the rightward direction is transferred between the read circuits 8*h*, and at the same time, the transferred digital signal ϕ2 is output toward an adjacent radiation detector 1 in the leftward direction. A read circuit 8*h* at a right end of the row transfers the digital signal ϕ2 output from a radiation detector 1 at a right end of an adjacent row between read circuits 8*h*, and at the same time, outputs the transferred digital signal ϕ2 toward an adjacent radiation detector 1 in the leftward direction. A radiation detector 1 at a left end of the row transfers the digital signal ϕ2 received from an adjacent radiation detector 1 in the rightward direction between read circuits 8*h*, and at the same time, outputs the transferred digital signal ϕ2 toward an adjacent radiation detector 1 in the downward direction.

Radiation detectors 1 from a third row to an outermost end row in the downward direction have a similar data transfer function. However, a radiation detector 1 at the outermost edge finally receiving transfer of data outputs the transferred digital signal φ2 toward the processing unit 2 via the through electrode 8f, the bump electrode 8g, and the surface electrode 4a. In this way, data transfer by daisy chain connection is realized so as to pass through all the radiation detectors 1 included in the radiation image sensor 100 without omission.

Note that the plurality of radiation detectors 1 included in the radiation image sensor 100 is electrically connected to the controller 3 by being connected in a string via the surface electrode 4a, the bump electrode 8e, the through electrode 8d, the through electrode 8f, and the bump electrode 8g. In this way, the read circuits 8h in the respective radiation detectors 1 can simultaneously receive the control signal θ from the controller 3.

In the example of the transfer direction illustrated in FIG. 6, the digital signal φ2 is transferred between a plurality of radiation detectors 1 in a transfer direction different from the transfer direction illustrated in FIG. 5 by daisy chain connection. That is, a plurality of radiation detectors 1 in an outermost end row on the left side among rows along a vertical direction outputs the digital signal φ2 from an upper end toward a radiation detector 1 at a lower end. Then, for a plurality of radiation detectors 1 in a second row adjacent to the outermost end row, an operation in which a data transfer direction is opposite to that of the above operation is performed, and a radiation detector 1 at an upper end of the row outputs the digital signal φ2 toward an adjacent radiation detector 1 in the rightward direction. Further, radiation detectors 1 from a third row to an outermost end row on the right side have a similar data transfer function. However, a radiation detector 1 at an outermost edge finally receiving transfer of data outputs the transferred digital signal φ2 toward the processing unit 2.

In the example of the transfer direction illustrated in FIG. 7, the digital signal φ2 is transferred for each of a plurality of radiation detectors 1 in a row along a left-right direction (parallel transfer for each row). That is, the plurality of radiation detectors 1 in the row along the left-right direction outputs the digital signal φ2 from a left end toward a radiation detector 1 at a right end. Then, the radiation detector 1 at the right end outputs the transferred digital signal φ2 toward the processing unit 2. At this time, a direction of data transfer (direction along a Y-axis in FIG. 7) and a transmission direction of the control signal θ between the plurality of radiation detectors 1 may be the same direction along the same transmission path, or may be directions intersecting each other. For example, the transmission direction of the control signal θ from the controller 3 may be a direction along an X-axis perpendicular to the data transfer direction. In this way, by reducing the number of column connections in the data transfer direction, it is possible to read the digital signal φ2 in parallel at high speed. At the same time, by reducing the number of parallel connections for transmitting the control signal θ, it is possible to reduce the number of control signals θ.

In the radiation image sensor 100 described above, a digital value based on a charge generated by each pixel of the charge generator 7 is output in each of the plurality of read circuits 8h in the plurality of radiation detectors 1. At this time, each of the plurality of read circuits 8h sequentially transfers data indicating a digital value to an adjacent read circuit 8h in response to a control signal from the outside, and then outputs the data to an adjacent radiation detector 1. With such a configuration, in at least some read circuits 8h in the plurality of radiation detectors 1, wiring for outputting data to the outside via the circuit board 4 becomes unnecessary. As a result, the wiring route for data output is simplified, and the reliability of the output information indicated by the data can be improved. For example, when wiring for data output is provided in the circuit board 4 for each of the plurality of read circuits 8h of the plurality of radiation detectors 1, it is necessary to provide a plurality of wiring layers in a depth direction of the circuit board 4, and a wiring structure becomes complicated as the number of pixels increases. On the other hand, in the present embodiment, a wiring structure is easily simplified.

Further, in the radiation image sensor 100, a plurality of read circuits 8h of one radiation detector 1 is configured to transfer data via all read circuits 8h included in the one radiation detector 1. In this case, the plurality of read circuits 8h transfers the digital signal φ2 indicating a digital value via all the read circuits 8h in response to a control signal θ from the outside. With such a configuration, wiring for outputting data to the outside becomes unnecessary in more read circuits 8h in the radiation detector 1. As a result, the wiring route for data output is further simplified, and the reliability of the output information indicated by the data can be further improved.

In the present embodiment, at least one of the read circuits 8h at the outermost edge among the plurality of read circuits 8h of the radiation detector 1 is configured to output data transferred from another adjacent read circuit 8h to the circuit board 4 in response to a control signal. According to this configuration, since the read circuit 8h at the outermost edge outputs the data transferred from another adjacent read circuit 8h to the circuit board 4, the read circuit 8h at the outermost edge can output data sequentially transferred via the plurality of read circuits 8h in the radiation detector 1 to the circuit board 4. In this way, wiring for outputting data from the plurality of read circuits 8h in the radiation detector 1 is unnecessary, and the number of wirings connected to one radiation detector 1 can be efficiently reduced. As a result, the reliability of the output information can be further improved.

Further, in the present embodiment, at least one of the read circuits 8h at the outermost edge among the plurality of read circuits 8h of the radiation detector 1 is configured to store and transfer data output from the read circuit 8h at the outermost edge of another radiation detector 1 adjacent to the radiation detector 1. According to this configuration, the read circuit 8h at the outermost edge in one radiation detector 1 functions to store and transfer data output from the read circuit 8h at the outermost edge of another radiation detector 1 adjacent to the one radiation detector 1. In this way, it is possible to shorten the wiring for outputting data from another radiation detector 1. As a result, the reliability of the output information can be further improved.

In the present embodiment, adjacent read circuits 8h in a one-dimensional direction among a plurality of read circuits 8h of the radiation detector 1 are configured to sequentially transfer data in the one-dimensional direction, and a read circuit 8h at an outermost edge in the one-dimensional direction among the plurality of read circuits 8h is configured to transfer data to an adjacent read circuit 8h in a direction substantially perpendicular to the one-dimensional direction. According to this configuration, data output from a plurality of read circuits 8h two-dimensionally disposed in the radiation detector 1 is transferred in order without omission in a short route between the plurality of read circuits 8h. As a result, the number of wirings connected from the radiation detector 1 to the outside can be reduced to the maximum. As a result, the reliability of the output information can be further improved.

In the present embodiment, the radiation detector 1 includes the read circuit board 8 in which the plurality of read circuits 8*h* is formed therein, and at least one of the read circuits 8*h* at the outermost edge outputs data to the circuit board 4 via the through electrode 8*f* penetrating the integrated circuit layer 8*b* of the read circuit board 8. According to this configuration, wiring connecting the read circuit 8*h* at the outermost edge and the circuit board 4 can be formed within a range of the charge generator 7, and a gap between the plurality of radiation detectors 1 can be reduced. As a result, it is possible to prevent occurrence of a dead zone in the radiation imaging device.

In one aspect, the radiation detector 1 includes the read circuit board 8 in which the plurality of read circuits 8*h* is formed therein, and data is input to at least one of the read circuits 8*h* at the outermost edge via the circuit board 4 and the through electrode 8*d* penetrating the integrated circuit layer 8*b* of the read circuit board 8. According to such a configuration, it is possible to form a wiring connecting the read circuits 8*h* at the outermost edge and the circuit board 4 within the range of the charge generator 7, and to reduce a gap between the plurality of radiation detectors 1. As a result, it is possible to prevent occurrence of a dead zone in the radiation imaging device.

The radiation detector of the disclosure is not limited to the above-described embodiment. The radiation detector of the disclosure can be variously modified without departing from the gist of the claims.

The number of radiation detectors 1 or the number of pixels in the radiation image sensor 100 in the above-described embodiment is an example, and may be changed in various ways.

Further, the data output by the radiation detector 1 is not limited to the digital signal indicating the charge corresponding to the energy of the radiation, and may be a digital value based on a charge corresponding to the number of radiation particles incident on each pixel of the radiation detector 1.

Figure 8:
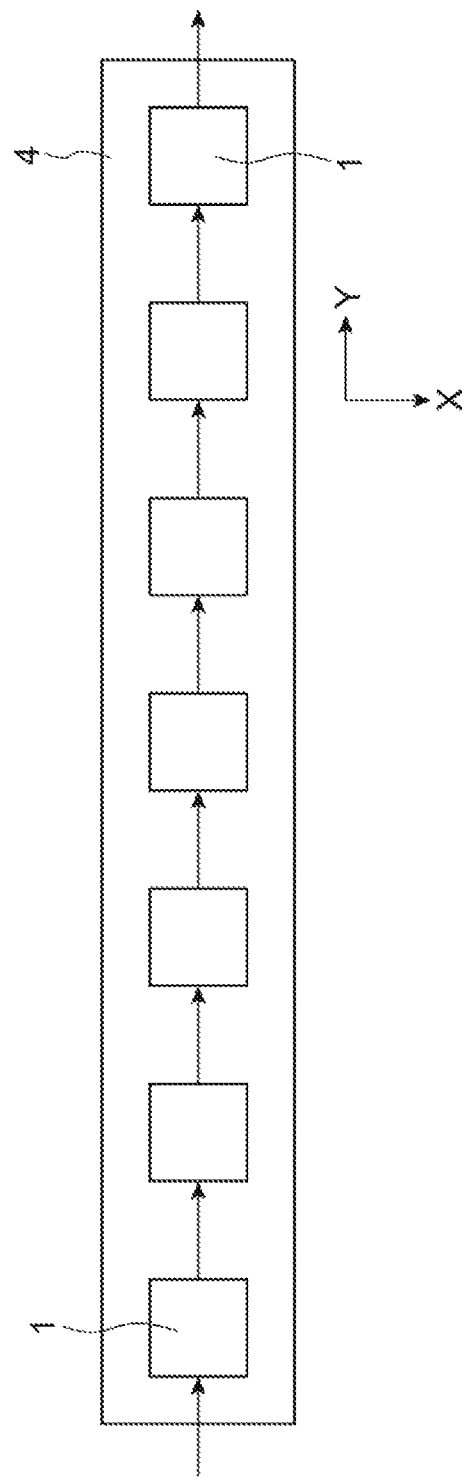
FIG. 8 is a plan view illustrating an example of a relationship between data transfer directions of the radiation detectors 1 one-dimensionally arranged on the circuit board 4 in a modification example.

An arrangement configuration of the plurality of radiation detectors 1 provided in the radiation image sensor 100 does not necessarily have to be a 2D arrangement configuration, and may be, for example, a one-dimensional arrangement configuration. FIG. 8 is a diagram illustrating a relationship between serial data transfer directions in the plurality of radiation detectors 1 included in the radiation image sensor 100 in such a case. In this modification, the digital signal $\phi 2$ is transferred between the plurality of radiation detectors 1 arranged along the left-right direction. That is, the plurality of radiation detectors 1 arranged along the left-right direction outputs the digital signal $\phi 2$ from the left end to the radiation detector 1 at the right end. Then, the radiation detector 1 at the right end outputs the transferred digital signal $\phi 2$ to the processing unit 2.

REFERENCE SIGNS LIST

100: radiation image sensor (radiation imaging device), 1: radiation detector, 4: circuit board, 7: charge generator, 8: read circuit board, 8*d*, 8*f*: through electrode, 8*h*: read circuit (reading unit).

The invention claimed is:
1. A radiation imaging device comprising:
a radiation detector in which a plurality of charge generation units configured to generate a charge corresponding to energy or the number of particles of incident radiation and a plurality of reading units configured to output a digital value based on the charge generated by each of the plurality of charge generation units are mutually stacked and two-dimensionally disposed; and
a circuit board on which a plurality of radiation detectors is disposed,
wherein the plurality of reading units are configured to transfer digital data to another adjacent radiation detector in response to a control signal from an outside source,
wherein each of the plurality of reading units is associated with a respective charge generation unit of the plurality of charge generation units, and is configured to output a digital value based on charge generated by said associated charge generation unit,
wherein the charge generation units are pixels,
wherein the plurality of reading units are configured to sequentially transfer the digital value to another adjacent reading unit in response to a control signal from an outside source, and
wherein the plurality of reading units are configured to transfer the digital value via all reading units included in the one radiation detector.

2. The radiation imaging device according to claim 1, wherein at least one of the reading units being an outermost unit in the radiation detector among the plurality of reading units is configured to output the data transferred from another adjacent reading unit to the circuit board in response to the control signal.

3. The radiation imaging device according to claim 2, wherein at least one of the reading units being an outermost unit in the radiation detector among the plurality of reading units of the radiation detector is configured to store or transfer the data output from the reading units being an outermost unit of another radiation detector adjacent to the radiation detector.

4. The radiation imaging device according to claim 2, further comprising
another circuit board in which the plurality of reading units is formed,
wherein at least one of the reading units being an outermost unit outputs the data to the circuit board via a through electrode penetrating the another circuit board.

5. The radiation imaging device according to claim 3, further comprising
another circuit board in which the plurality of reading units is formed,
wherein the data is input to at least one of the reading units being an outermost unit via the circuit board and a through electrode penetrating the another circuit board.

6. The radiation imaging device according to claim 1, wherein each of the plurality of reading units includes:
a signal converter configured to convert an analog signal based on the charge into the data indicating the digital value, and
a memory configured to store the data indicating the digital value output by the signal converter.

7. A radiation imaging device comprising:
a radiation detector in which a plurality of charge generation units configured to generate a charge corresponding to energy or the number of particles of incident radiation and a plurality of reading units configured to output a digital value based on the charge generated by each of the plurality of charge generation units are mutually stacked and two-dimensionally disposed; and a circuit board on which a plurality of radiation detectors is disposed, wherein the plurality of reading units are configured to transfer digital data to another adjacent radiation detector in response to a control signal from an outside source, wherein each of the plurality of reading units is associated with a respective charge generation unit of the plurality of charge generation units, and is configured to output a digital value based on charge generated by said associated charge generation units, wherein the charge generation units are pixels, wherein the plurality of reading units included in one radiation detector are divided into a plurality of regions, and one data input and one data output are included for each of the plurality of regions, and wherein the plurality of reading units included in one of the regions are configured to sequentially transfer the digital value to another adjacent reading unit in response to a control signal from an outside source, and transfer the digital value via all the reading units included in one of the regions, and then output the digital data to an adjacent radiation detector from the one data output.

8. The radiation imaging device according to claim 7, wherein at least one of the reading units being an outermost unit in the radiation detector among the plurality of reading units is configured to output the data transferred from another adjacent reading unit to the circuit board in response to the control signal.

9. The radiation imaging device according to claim 8, wherein at least one of the reading units being an outermost unit in the radiation detector among the plurality of reading units of the radiation detector is configured to store or transfer the data output from the reading units being an outermost unit of another radiation detector adjacent to the radiation detector.

10. The radiation imaging device according to claim 8, further comprising
another circuit board in which the plurality of reading units is formed,
wherein at least one of the reading units being an outermost unit outputs the data to the circuit board via a through electrode penetrating the another circuit board.

11. The radiation imaging device according to claim 9, further comprising
another circuit board in which the plurality of reading units is formed,
wherein the data is input to at least one of the reading units being an outermost unit via the circuit board and a through electrode penetrating the another circuit board.

12. The radiation imaging device according to claim 7, wherein each of the plurality of reading units includes:
a signal converter configured to convert an analog signal based on the charge into the data indicating the digital value, and
a memory configured to store the data indicating the digital value output by the signal converter.

13. A radiation imaging device comprising:
a radiation detector in which a plurality of charge generation units configured to generate a charge corresponding to energy or the number of particles of incident radiation and a plurality of reading units configured to output a digital value based on the charge generated by each of the plurality of charge generation units are mutually stacked and two-dimensionally disposed; and
a circuit board on which a plurality of radiation detectors is disposed, wherein the plurality of reading units are configured to transfer digital data to another adjacent radiation detector in response to a control signal from an outside source, wherein each of the plurality of reading units is associated with a respective charge generation unit of the plurality of charge generation units, and is configured to output a digital value based on charge generated by said associated charge generation units, wherein the charge generation units are pixels, wherein the plurality of reading units are configured to sequentially transfer the digital value to another adjacent reading unit in response to a control signal from an outside source, wherein an outermost reading unit of the plurality of reading units is configured to output the digital data to another adjacent radiation detector in response to a control signal from an outside source, wherein the plurality of radiation detectors are connected by a daisy chain connection and are configured to transfer the digital value via the plurality of radiation detectors.

14. The radiation imaging device according to claim 13, wherein at least one of the reading units being an outermost unit in the radiation detector among the plurality of reading units is configured to output the data transferred from another adjacent reading unit to the circuit board in response to the control signal.

15. The radiation imaging device according to claim 14, wherein at least one of the reading units being an outermost unit in the radiation detector among the plurality of reading units of the radiation detector is configured to store or transfer the data output from the reading units being an outermost unit of another radiation detector adjacent to the radiation detector.

16. The radiation imaging device according to claim 14, further comprising
another circuit board in which the plurality of reading units is formed,
wherein at least one of the reading units being an outermost unit outputs the data to the circuit board via a through electrode penetrating the another circuit board.

17. The radiation imaging device according to claim 15, further comprising
another circuit board in which the plurality of reading units is formed,
wherein the data is input to at least one of the reading units being an outermost unit via the circuit board and a through electrode penetrating the another circuit board.

18. The radiation imaging device according to claim 13, wherein each of the plurality of reading units includes:
a signal converter configured to convert an analog signal based on the charge into the data indicating the digital value, and
a memory configured to store the data indicating the digital value output by the signal converter.

* * * * *